(12) United States Patent
Meyer et al.

(10) Patent No.: US 9,335,025 B2
(45) Date of Patent: May 10, 2016

(54) DAYLIGHT ILLUMINATION APPARATUS

(75) Inventors: Jörg Meyer, Lippstadt (DE); Martinus P. J. Peeters, Weert (NL); René T. Wegh, Veldhoven (NL); Ramon P. Van Gorkom, Eindhoven (NL); Rifat A. M. Hikmet, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 151 days.

(21) Appl. No.: 13/819,855

(22) PCT Filed: Aug. 26, 2011

(86) PCT No.: PCT/IB2011/053747
§ 371 (c)(1),
(2), (4) Date: Feb. 28, 2013

(87) PCT Pub. No.: WO2012/029004
PCT Pub. Date: Mar. 8, 2012

(65) Prior Publication Data
US 2013/0155643 A1    Jun. 20, 2013

(30) Foreign Application Priority Data

Sep. 2, 2010    (EP) .................................. 10175055

(51) Int. Cl.
*F21K 2/00*     (2006.01)
*F21V 9/02*     (2006.01)
*F21V 8/00*     (2006.01)
*F21S 11/00*    (2006.01)
(Continued)

(52) U.S. Cl.
CPC ................. *F21V 9/02* (2013.01); *F21S 11/007* (2013.01); *F21S 19/005* (2013.01); *G02B 6/0008* (2013.01); *F21V 9/14* (2013.01); *F21V 9/16* (2013.01); *F21Y 2101/02* (2013.01)

(58) Field of Classification Search
USPC ....................... 362/1, 2, 34, 84, 253
See application file for complete search history.

(56) References Cited

U.S. PATENT DOCUMENTS 4,758,930 A    7/1988  Pomares
5,184,881 A    2/1993  Karpen
(Continued)

FOREIGN PATENT DOCUMENTS

CN    101614359 A    12/2013
EP    1139440 A2    10/2001
(Continued)

OTHER PUBLICATIONS

V. Garcia et al; "Natural Illumination of Deep-Plan Office Buildings: Light Pipe Strategies", Proceedings of ISES Solar World Congress, Jun. 14, 2003, pp. 1-8, XP002665902.
(Continued)

*Primary Examiner* — Evan Dzierzynski
*Assistant Examiner* — Meghan Ulanday
(74) *Attorney, Agent, or Firm* — Meenakshy Chakravorty

(57) ABSTRACT

The invention relates to a daylight illumination apparatus. A daylight collector (3) collects daylight (4), which is guided to an illumination location to be illuminated along an optical path by a light guide (5), wherein the daylight is absorbed by the light guide. A photoluminescent material (6, 8) is arranged within the optical path and emits photoluminescent light that compensates for the absorption of the daylight by the light guide. Absorption losses of the daylight can therefore effectively be compensated, without necessarily needing, for example, an active compensation light source. This allows providing compensated daylight illumination in a technically relatively simple way.

20 Claims, 4 Drawing Sheets

(51) Int. Cl.
*F21S 19/00* (2006.01)
*F21V 9/14* (2006.01)
*F21Y 101/02* (2006.01)
*F21V 9/16* (2006.01)

(56) References Cited

U.S. PATENT DOCUMENTS

| | | | |
|---|---|---|---|
| 6,130,781 A | 10/2000 | Gauvin | |
| 2006/0104081 A1 | 5/2006 | Fraval | |
| 2009/0040781 A1 | 2/2009 | Ito | |

FOREIGN PATENT DOCUMENTS

| | | | |
|---|---|---|---|
| GB | 2041506 A | 10/1980 | |
| JP | 1995057525 | 3/1995 | |
| JP | 7270637 A | 10/1995 | |
| JP | 1996249909 | 9/1996 | |
| JP | 2002197907 A | 7/2002 | |
| JP | 2006061685 A | 3/2006 | |
| SU | 457365 A | 8/1987 | |
| WO | 2003058117 A2 | 7/2003 | |
| WO | 2004044481 A1 | 5/2004 | |
| WO | 2010051595 A1 | 5/2010 | |
| WO | 2010070169 A1 | 6/2010 | |

OTHER PUBLICATIONS

Daniel Karpen; "Full-Spectrum Polarized Lighting Recreates Daylight", Consulting-Specifying Engineer, Apr. 1994, pp. 42-48.

Lorne Whitehead et al; "Using Core Sunlighting to Improve Office Illumination", Proceedings Experiencing Light 2009, Intnl Conference on the Effects of Light on Wellbeing, Oct. 26-27, 2009, pp. 106-113.

DAYLIGHT ILLUMINATION APPARATUS

FIELD OF THE INVENTION

The invention relates to a daylight illumination apparatus and a daylight illumination method. The invention relates further to an object like a building comprising the daylight illumination apparatus.

BACKGROUND OF THE INVENTION

US 2006/0104081 A1 discloses a lighting system for a building having rooms. The lighting system includes a plurality of light collectors for collecting ambient light and a plurality of first light guides for conveying the light to a light accumulating vessel which has an internal reflective surface. A plurality of second light guides extend from the vessel to the rooms so that light which is collected and reflected in the vessel can be guided to the rooms for supplying the rooms with the light. The lighting system further comprises white light sources which are coupled to the vessel such that light of the white light sources can enter the vessel for compensating absorption losses of the daylight in the first light guides.

This lighting system with the arrangement of the light collectors, the first light guides for transferring ambient light from the light collectors into the vessel, the white light sources for providing light within the vessel for compensating for absorption losses of the ambient light in the first light guides and the second light guides for transferring the light of the vessel to the rooms of the building is technically complex.

SUMMARY OF THE INVENTION

It is an object of the present invention to provide a daylight illumination apparatus and a daylight illumination method, which allow providing a daylight illumination in a technically less complex way. It is a further object of the present invention to present an object like a building comprising the daylight illumination apparatus.

In a first aspect of the present invention a daylight illumination apparatus is presented, wherein the daylight illumination apparatus comprises:
  a daylight collector for collecting daylight,
  a light guide for guiding the daylight to an illumination location to be illuminated along an optical path, wherein the daylight is absorbed by the light guide,
  a photoluminescent material for emitting photoluminescent light for illuminating the illumination location when the photoluminescent material is illuminated by the daylight, wherein the photoluminescent material is arranged within the optical path and adapted such that the photoluminescent light compensates for the absorption of the daylight by the light guide.

Since the photoluminescent material is adapted such that the photoluminescent light compensates for the absorption of the daylight by the light guide and since the photoluminescent light is generated by illuminating the photoluminescent material with the collected daylight, absorption losses of the daylight can effectively be compensated, without necessarily needing an active light source like a white light source or a light emitting diode (LED) and without necessarily needing a sensor for monitoring the intensity of prescribed wavelengths of light. In particular, a daylight illumination apparatus can be manufactured, without needing to collect ambient light and light of a white light source in a vessel and without needing to transfer the resulting light within the vessel via light guides to, for example, rooms of a building. The daylight illumination apparatus comprising the photoluminescent material for compensating for absorption losses of the daylight by the light guide allows therefore providing daylight illumination in a technically less complex way.

The light guide preferentially comprises one or several optical fibers. The one or several optical fibers can be made of, for example, polymeric materials and/or glass.

The daylight illumination apparatus can be adapted to be comprised by an object like a building, wherein the daylight illumination apparatus is adapted to illuminate regions, for example, rooms, within the object by daylight and the photoluminescent light. In particular, the daylight illumination apparatus can comprise several light guides for guiding the daylight to several regions within the object, in particular, to several rooms within a building.

The light guide generally absorbs a part, in particular, a spectral part, of the daylight and the photoluminescent material is preferentially adapted such that the photoluminescent light compensates for the absorption of the part of the daylight by the light guide. In an embodiment, the light guide absorbs light of a first spectral part of the daylight more than light of a second spectral part of the daylight, wherein the photoluminescent material is adapted to emit photoluminescent light having a wavelength in the first spectral part. The daylight illumination apparatus can therefore be adapted to compensate for absorption losses in certain wavelength ranges of the daylight, wherein the photoluminescent material is adapted to emit photoluminescent light in these certain wavelength ranges, i.e. in the more absorbed first spectral part. This results in an illumination at one or several illumination locations, for example, in one or several rooms of a building, which is more similar to an illumination by direct natural daylight. Direct natural daylight is light of the sun, which is not altered by, for example, transmitting the daylight through a light guide like an optical fiber.

It is further preferred that the photoluminescent material is adapted to emit photoluminescent light in a visible red wavelength range. Since light guides like optical fibers generally absorb daylight more in the visible red wavelength range than in other visible wavelength ranges, by using photoluminescent material being adapted to emit photoluminescent light in the visible red wavelength range an illumination of the illumination location can be provided, which can be more similar to an illumination by direct natural daylight.

The photoluminescent material, which can also be called phosphor, can be an inorganic material or an organic material.

It is further preferred that the photoluminescent material is adapted to emit photoluminescent light having a polarization being similar to the natural polarization of daylight. Natural daylight exhibits a preferential polarization direction due to scattering of the daylight before it reaches an object. The photoluminescent material comprises, for example, organic phosphor emitting photoluminescent light having a polarization being similar to the natural polarization of daylight. This can be obtained by orienting organic phosphor molecules in a matrix with their optical axes parallel to the preferential polarization direction of direct natural daylight, wherein the optical axes are axes along which preferential absorption and emission occur. By adapting the photoluminescent material such that it emits photoluminescent light having a polarization being similar to the natural polarization of direct daylight, the degree of similarity between a) the actual illumination at the illumination location by a combination of the daylight guided to the illumination location and the photoluminescent light and b) an illumination by direct daylight can be further increased.

The photoluminescent material may be provided by providing a photoluminescent screen or a photoluminescent window, which is arranged within the optical path of the daylight. The photoluminescent screen may be made out of essentially visibly carrier matrices like transparent plastics, for example, PMMA or polycarbonate, and is loaded with the photoluminescent material, which may be inorganic like (Ca,Sr)AlSiN$_3$:Eu or (Ca,Sr,Ba)$_2$Si$_5$N$_8$:Eu or which may be, in particular for larger screen sizes, organic like perylenes, for example, Lumogen F Red 305, F Pink 285, F Orange 240, or a mixture thereof. The photoluminescent window may be fabricated out of similar materials, but due to the smaller size also higher cost materials like glass, transparent ceramics, more expensive inorganic phosphors like CaS:Eu or CaSe:Eu are affordable for the photoluminescent window.

Carrier matrices for the luminescent materials may be loaded with the optically active component either by compounding or coating techniques. The preferred technique depends on the matrix material properties and the processing parameters. For example, photoluminescent material, in particular, organic photoluminescent material, is preferentially incorporated in plastics like PMMA or coated on glass.

Glass carriers and ceramics with the photoluminescent material have relatively small form factors, which increase design freedom. In addition, the benefit of using glass or transparent ceramics as carrier material is a high optical transparency, a high durability and a good performance over lifetime.

The light guide is preferentially adapted to guide the daylight to the photoluminescent material. It is further preferred that the light guide comprises an optical fiber having an in-coupling site for coupling the daylight into the optical fiber and an out-coupling site for coupling the daylight out of the optical fiber, wherein the photoluminescent material is located at the out-coupling site of the optical fiber. In particular, an optical window and/or an optical screen can be located at the out-coupling site of the optical fiber, wherein the photoluminescent material is arranged on and/or within the optical window and/or the optical screen. The photoluminescent light used for illuminating the illumination location is therefore not adversely affected by the optical fiber, in particular, the light guide does not cause absorption losses of the photoluminescent light. This improves the illumination of the illumination location by the combination of the daylight and the photoluminescent light.

It is further preferred that the daylight illumination apparatus comprises an active compensation light source for generating compensation light for further compensating for the absorption of the daylight by the light guide. An active light source is a light source which does not generate light only if illuminated by light of another light source, but which generates light by itself. An active light source comprises, for example, an LED or a gas discharge lamp. The active light source can comprise a phosphor for converting at least a part of the actively generated light of the active light source into compensation light having a desired spectral distribution. The additional use of the active compensation light source can further improve the compensation of absorption losses of the daylight in the light guide and can therefore further improve the mimicry of direct natural daylight.

In an embodiment, the light guide absorbs light of a first spectral part of the daylight more than light of a second spectral part of the daylight, wherein the active compensation light source is adapted to generate compensation light having a wavelength in the first spectral part. The active compensation light source is preferentially adapted to emit compensation light in a visible red wavelength range. This allows spectrally compensating for the absorption by the light guide and therefore further improves the mimicry of direct natural daylight.

It is further preferred that the active compensation light source is adapted to generate compensation light having a spectral distribution being similar to the spectral distribution of direct natural daylight. For example, one or several LEDs can be combined with one or several phosphor materials to an active compensation light source for generating compensation light having a spectral distribution being similar to the spectral distribution of direct natural daylight. This allows compensating for the overall absorption loss of the collected daylight by the light guide.

It is further preferred that the daylight illumination apparatus comprises:
    an intensity determination unit for determining the intensity of the light at the illumination location, and
    a control unit for controlling the active compensation light source depending on the determined intensity. This allows providing a desired light intensity at the illumination location, even if the intensity of the daylight changes. Moreover, the intensity of the light from the active compensation light source can be adjusted to the intensity of the daylight, in particular, if the intensity of the daylight is reduced, the intensity of the active compensation light source can be reduced accordingly. This further improves the mimicry of direct natural daylight.

In an embodiment, the daylight illumination apparatus comprises a polarizer for polarizing at least one of the daylight and the photoluminescent light to a polarization being similar to the natural polarization of daylight. That means that the polarizer can polarize the daylight, which has been guided by the light guide, and/or the photoluminescent light emitted by the photoluminescent material. The polarizer can also be adapted to polarize compensation light, which may optionally be provided by an active compensation light source. This further improves the mimicry of the direct natural daylight.

It is preferred that the daylight illumination apparatus comprises a light guide entering probability reducing unit for reducing the probability of the photoluminescent light to enter the light guide. With respect to the optical path, the light guide entering probability reducing unit is preferentially arranged between the light guide and the photoluminescent material. The light guide entering probability reducing unit can be a multilayer dielectric reflector being adapted for allowing light coming out of the light guide to transmit through the multilayer dielectric reflector and for reflecting the photoluminescent light emitted by the photoluminescent material. The light guide entering probability reducing unit can also comprise a light expander for expanding the light guided by the light guide before meeting the photoluminescent material. In an embodiment, the light expander comprises a mixing chamber comprising a small entrance hole where light from the light guide enters, an exit window comprising the phosphor and a diffuse reflecting coating or layer on the remaining inner surface of the mixing chamber. In that way photoluminescent light that is emitted into the mixing chamber has a small chance to enter the light guide, and a high chance to be diffusely reflected towards the exit window. In a further embodiment, the light guide entering probability reducing unit comprises a transparent plate having two opposing main surfaces and side surfaces connecting the main surfaces, wherein the light guide and the transparent plate are adapted such that light leaving the light guide enters the transparent plate via a side surface of the transparent plate and that the light leaves the transparent plate via a main surface of the transparent plate, wherein the photoluminescent material is arranged on the main surface through which the light leaves the transparent plate. The transparent plate is preferentially transparent to visible light. In a further embodiment, the light guide entering probability reducing unit comprises a transparent plate having two opposing main surfaces and side surfaces connecting the main surfaces, wherein the light guide and the transparent plate are adapted such that light leaving the light guide enters the transparent plate via a side surface of the transparent plate and that the light leaves the transparent plate via a main surface of the transparent plate, wherein the photoluminescent material is incorporated into the transparent plate.

Since the light guide entering probability reducing unit reduces the probability of the photoluminescent light to enter the light guide, losses of the photoluminescent light caused by coupling the photoluminescent light into the light guide can be reduced, thereby further improving the illumination of the illumination location by the combination of daylight and photoluminescent light.

In a further aspect of the present invention an object comprising the daylight illumination apparatus is presented, wherein the daylight illumination apparatus is adapted to illuminate regions within the object by daylight. The object is, for example, a building comprising several rooms, wherein the daylight illumination apparatus can be adapted to illuminate at least one of these rooms, which may be regarded as illumination location, by the collected daylight and the photoluminescent light. The at least one room can be illuminated by further light generated by, for example, an active compensation light source.

In another aspect of the present invention a daylight illumination method is presented, wherein the daylight illumination method comprises:
  collecting daylight by a daylight collector,
  guiding the daylight to an illumination location to be illuminated along an optical path by a light guide, wherein the daylight is absorbed by the light guide,
  illuminating a photoluminescent material by the daylight for emitting photoluminescent light for illuminating the illumination location when illuminated by the daylight, wherein the photoluminescent material is arranged within the optical path and the photoluminescent light compensates for the absorption of the daylight by the light guide.

It shall be understood that the daylight illumination apparatus of claim 1, the object of claim 14, and the daylight illumination method of claim 15 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
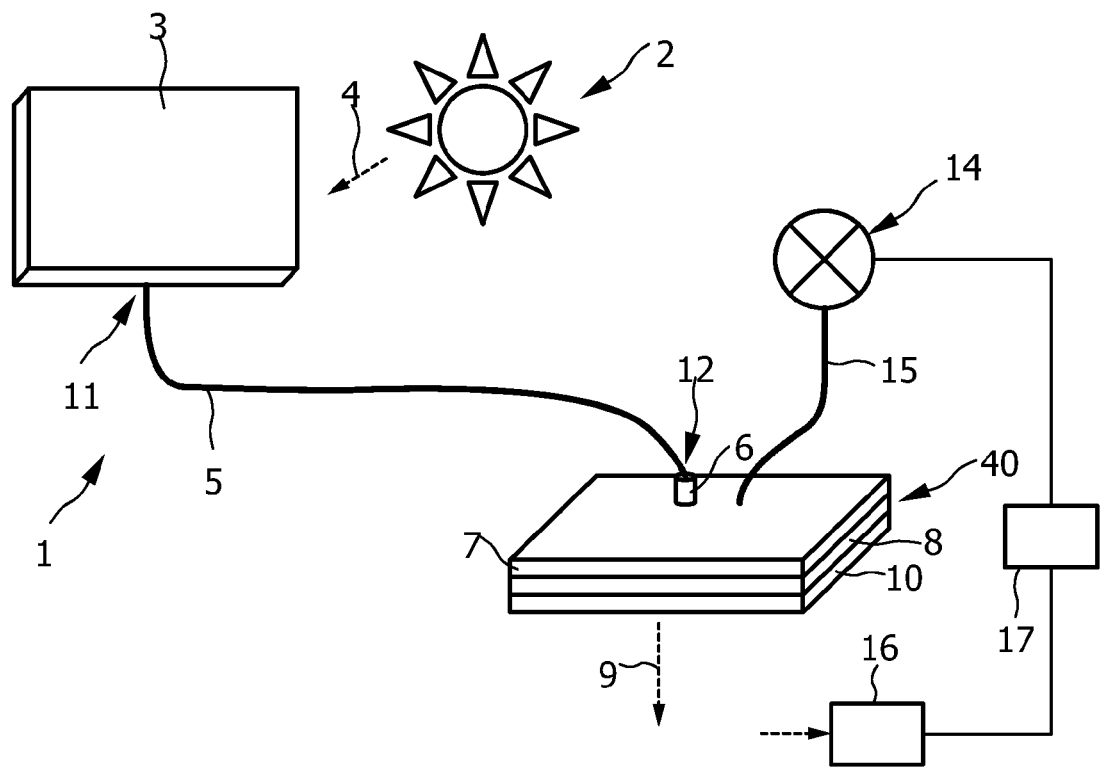
FIG. 1 shows schematically and exemplarily an embodiment of a daylight illumination apparatus.

FIG. 1 shows schematically and exemplarily an embodiment of a daylight illumination apparatus. The daylight illumination apparatus 1 comprises a daylight collector 3 for collecting daylight 4 of the sun 2. The daylight illumination apparatus 1 further comprises a light guide 5 for guiding the daylight to an illumination location to be illuminated along an optical path. The illumination location is, for example, defined by a room within a building, which should be illuminated by daylight. While being guided by the light guide 5, the daylight is absorbed. The daylight illumination apparatus comprises photoluminescent material for emitting photoluminescent light for illuminating the illumination location. The photoluminescent material is arranged within the optical path such that the photoluminescent material can be illuminated by the guided daylight for generating the photoluminescent light. The photoluminescent material is adapted such that the photoluminescent light compensates for the absorption of the daylight by the light guide 5.

The daylight collector 3 is preferentially a sunlight tracking lens array as commercialized by, for example, the company Parans Solar Lighting AB, which is connected to the light guide 5. Other systems of mirror or lens arrays, which collect daylight, may be used as well.

The photoluminescent material is comprised by a photoluminescent window 6 and a photoluminescent screen 8, which are both arranged within the optical path of the daylight. In another embodiment, the daylight illumination apparatus may comprise the photoluminescent window 6 or the photoluminescent screen 8. The photoluminescent screen 8 is made of essentially visibly transparent plastics like PMMA or polycarbonate and is loaded with the photoluminescent material. The photoluminescent material can be mixed within or it can be provided on a surface of the plastics. Instead of or in addition to using plastics as base material, the photoluminescent screen can comprise another base material like glass or transparent ceramics. Also the base material of the photoluminescent window 6 can be transparent plastics, glass, transparent ceramics or another transparent material. Moreover, also with respect to the photoluminescent window 6 the photoluminescent material can be incorporated within the base material and/or the base material can be coated by the photoluminescent material. Preferentially, the photoluminescent screen 8 comprises transparent plastics as base material and the photoluminescent window 6 comprises glass or transparent ceramics as base material.

The light guide 5 comprises an optical fiber which can be made of, for example, polymeric materials and/or glass. While being guided through the optical fiber, the optical fiber absorbs light of a first spectral part of the daylight more than light of a second spectral part of the daylight. That means the daylight is not homogenously absorbed with respect to the different wavelengths, but certain spectral regions of the daylight are more absorbed than other spectral regions of the daylight. In particular, an optical fiber absorbs generally more daylight in the red spectral region than in the other visible spectral regions.

Figure 2:
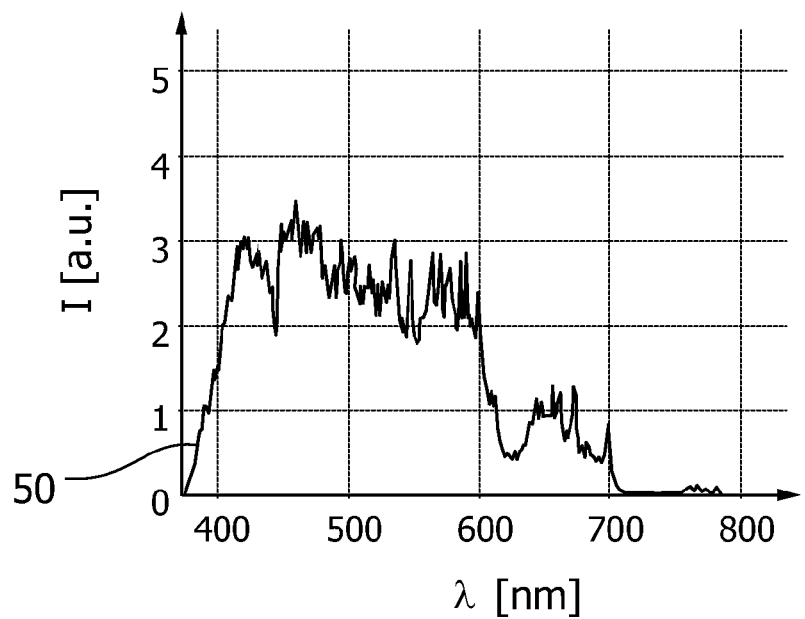
FIG. 2 shows exemplarily an intensity spectrum of daylight after having been transmitted through an optical fiber.

FIG. 2 shows schematically and exemplarily a curve 50 representing the spectral distribution of the intensity of daylight, after having been transmitted through an optical fiber made of plastics. In FIG. 2, the intensity of the daylight after having left the optical fiber is shown in arbitrary units depending on the wavelength λ. The intensity is reduced for wavelengths being larger than about 600 nm. The photoluminescent light of the photoluminescent material illuminated by the daylight is therefore preferentially adapted such that they provide light having wavelengths being larger than 600 nm. In particular, the photoluminescent light emitted by the photoluminescent material when illuminated by daylight has preferentially wavelengths in the visible red wavelength range.

Preferred photoluminescent materials are inorganic phosphors like $(Ca,Sr)AlSiN_3$:Eu or $(Ca,Sr,Ba)_2Si_5N_8$:Eu or, in particular for larger optical screen sizes, organic phosphors like perylenes, for example, Lumogen F Red 305, F Pink 285, F Orange 240, or a mixture thereof. The photoluminescent window 6 and the photoluminescent screen 8 can comprise one of these phosphors or a combination of these phosphors.

The light guide 5 comprising the optical fiber has an incoupling site 11 for coupling the daylight into the optical fiber and an out-coupling site 12 for coupling the daylight out of the optical fiber. The photoluminescent window 6 and the photoluminescent screen 8 are located at the out-coupling site 12 of the optical fiber. In particular, the photoluminescent window 6 is directly connected to the optical fiber such that the daylight guided by the optical fiber is directly coupled into the photoluminescent window 6. The photoluminescent window 6 is further connected to a sandwich-like optical structure 40 comprising an outcoupling luminaire 7, the phosphor screen 8 and a polarizer 10 such that the daylight guided by the light guide 5 transmits through the photoluminescent window 6, thereby generating photoluminescent light, through the outcoupling luminaire 7, then through the phosphor screen 8, wherein further photoluminescent light is generated, and finally through the polarizer 10. The outcoupling luminaire 7, the photoluminescent screen 8 and the polarizer 10 are preferentially each formed like a plate, wherein the different plates are put together for forming the sandwich-like optical structure 40.

The photoluminescent window 6 is optically coupled to the out-coupling site of the optical fiber. It has a diameter being identical or similar to the diameter of the optical fiber and is essentially a color converting extension to the optical fiber. The photoluminescent window 6 may be a ceramic comprising in part or in its entirety one or more luminescent materials, or a compound of one or more luminescent materials with a transparent matrix material like plastics or glass, or it may be a coating of one or more luminescent materials on the out-coupling site of the optical fiber.

The photoluminescent screen 8 is optically coupled to the outcoupling luminaire 7, wherein the size of the photoluminescent screen 8 and the outcoupling luminaire 7 are essentially identical. The photoluminescent screen is preferentially made out of plastics, which is transparent in the visible like polycarbonate or PMMA. At least one luminescent material may be physically mixed with the transparent plastics acting as a filler or it may be coated onto the surface of the transparent plastics.

The amount and composition of the luminescent material of the photoluminescent window 6 and the photoluminescent screen 8 is determined by the extent of spectral losses in the fiber, the absorption strength and spectrum and the emission efficiency and spectrum of the luminescent materials. The luminescent materials absorb preferentially such an amount of daylight from the light guide that after conversion of the absorbed light the sum of remaining daylight and converted light mimics unaltered daylight as much as possible. If, in an embodiment, the daylight illumination apparatus comprises only one of the photo-luminescent window 6 and the photoluminescent screen 8, the amount and composition of the photoluminescent material of the photoluminescent window 6 or of the photoluminescent screen 8 are preferentially chosen such that the photoluminescent light emitted by the photoluminescent window 6 or the photoluminescent screen 8 compensates for absorption losses of the daylight in the optical fiber such that natural direct daylight is imitated.

The outcoupling luminaire 7 includes optics for expanding the light received from the light guide 5 and for generating a light distribution for illuminating, for example, a room of a building. The outcoupling luminaire 7 can be adapted for accent lighting, illumination of large areas, et cetera. For example, the outcoupling luminaires provided by the above mentioned company Parans Solar Lighting AB can be used.

The polarizer 10 is adapted for polarizing the daylight and the photoluminescent light to a polarization being similar to a natural polarization of direct daylight. The polarizer can be an absorptive polarizer, i.e. one polarization direction of the light is absorbed and the other one is transmitted, or a reflective polarizer, i.e. one polarization direction is reflected and the other one is transmitted. The advantage of the reflective polarizer is that the reflected light can be redirected to the polarizer after one or several reflections in the sandwich-like optical structure 40, in which the polarization direction can have changed such that now the light is transmitted through the polarizer, resulting in a higher light gain than in case of an absorptive polarizer. Since the polarizer is placed after the photoluminescent screen, the polarizer can be adapted to polarize both the remaining daylight and the photoluminescent light. Alternatively, the polarizer can be placed before the photoluminescent screen, thereby polarizing the daylight which becomes depolarized by travelling through the light guide and not polarizing the photoluminescent light emitted by the photoluminescent screen. The photoluminescent screen can comprise organic photoluminescent molecules that can be oriented along an axis in the matrix parallel to the polarization direction of the incoming daylight. In that case the photoluminescent molecules absorb the daylight and emit light having the same polarization, i.e. having the polarization of direct natural daylight.

The daylight illumination apparatus 1 further comprises an active compensation light source 14 for generating compensation light for further compensating for absorption losses of the daylight within the light guide. The active compensation light source 14 is a light source which does not generate light only, if illuminated by light of another light source, but which generates light by itself. The active compensation light source can comprise one or several LEDs and phosphor, wherein at least a part of the light of the LEDs is converted to photoluminescent light by the phosphor of the active compensation light source 14. The one or several LEDs and the phosphor of the active compensation light source 14 are preferentially adapted such that the light generated by the active compensation light source 14 comprises a spectral light distribution being similar to the spectral light distribution of direct natural daylight. Together with the daylight altered by the light guide and spectrally compensated by the photoluminescent material of the photoluminescent window 6, the compensation light is mixed in the outcoupling luminaire 7. Alternatively, the one or several LEDs and the phosphor of the active compensation light source 14 are adapted such that the light generated by the active compensation light source 14 comprises a spectral light distribution being similar to the spectral light distribution of daylight altered by the light guide. Both the altered daylight from the light guide and the light from the active compensation light source 14 can be subsequently compensated spectrally by the photoluminescent screen 8, to mimic direct natural daylight. In both cases, the active compensation light source 14 compensates for a loss of light flux level by travelling through the light guide.

In other embodiments, instead of LEDs other artificial light sources like a gas discharge lamp can be used.

For the active compensation light source it is preferred that one or several blue emitting InGaN-type LEDs are used, which are converted to a daylight type emission spectrum using phosphors emitting in the green to yellow spectral region like $(Y,Lu,Gd)_3Al_5O_{12}$:Ce, $(Ba,Sr)_2SiO_4$:Eu and Ca-α-SiAlON:Eu and phosphors emitting in the orange to red spectral region like $(Ca,Sr)SiAlN_3$:Eu, $(Ba,Sr,Ca)_2Si_5N_8$:Eu, Ca and Ca(S,Se):Eu. As an alternative the orange to red emitting phosphors may be replaced by one or several AlInGaP-type LEDs emitting in that spectral region. This applies also to the green to yellow emitting phosphors, which may be replaced by one or several green to yellow emitting InGaN-type LEDs. Replacement of phosphors by LEDs may increase colour variability.

As already mentioned above, the optical fiber of the light guide 5 absorbs light of a first spectral part of the daylight more than light of a second spectral part of the daylight. In particular, a sub-spectrum in the visible red wavelength range is more absorbed than a sub-spectrum in another wavelength range. In an embodiment, the active compensation light source can therefore be adapted to generate compensation light in the more absorbed first spectral part, in particular, in the visible red wavelength range. The active compensation light source can therefore be adapted to compensate the spectral absorption losses of the daylight within the optical fiber.

The compensation light generated by the active compensation light source 14 is guided to the optical structure 40 via a light guide 15 which is or comprises an optical fiber. The compensation light is coupled into the sandwich-like optical structure 40 and transmitted through the outcoupling luminaire 7, the photoluminescent screen 8 and the polarizer 10. The outcoupling luminaire 7 also comprises optics for expanding the light received via the light guide 15 such that also this light can be used for illuminating, for example, a room of a building. The outcoupling luminaire 7 comprises, for example, an inner space with reflective inner surfaces for mixing the daylight received via the light guide 5 and the compensation light received via the light guide 15 within the inner space. The mixed light can then leave the inner space in the direction of the photoluminescent screen 8.

The daylight illumination apparatus 1 generates therefore compensated daylight 9, wherein the collected daylight is compensated by using the photoluminescent material of the photoluminescent window 6 and the photoluminescent screen 8 and by optionally using the compensation light generated by the compensation light source 14.

The intensity of the compensated daylight 9 can be determined by an intensity determination unit 16, wherein a control unit 17 can control the active compensation light source 14 depending on the determined intensity. This allows providing a desired light intensity at the illumination location, for example, within a room of a building, even if the intensity of the external daylight changes.

Figure 3:
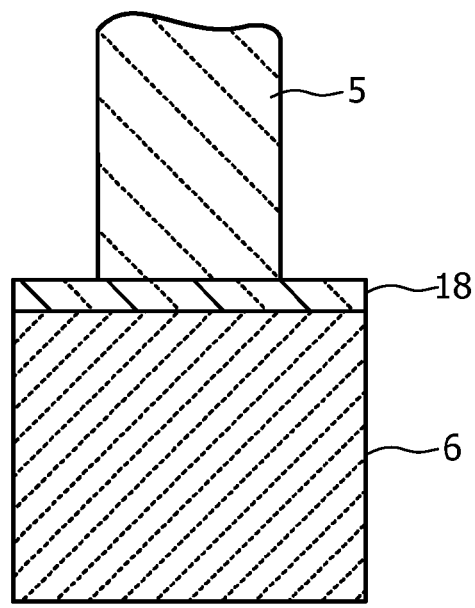
FIG. 3 shows schematically and exemplarily an embodiment of a light guide entering probability reducing unit for reducing the probability of photoluminescent light to enter a light guide.

The daylight illumination apparatus can comprise a light guide entering probability reducing unit for reducing the probability of the photoluminescent light to enter the light guide. Such a light guide entering probability reducing unit reduces a possible loss of photoluminescent light caused by entering the light guide. FIG. 3 shows an embodiment of a light guide entering probability reducing unit.

In the embodiment shown in FIG. 3, the light guide entering probability reducing unit 18 is arranged between the light guide 5 and the photoluminescent window 6 comprising the photoluminescent material. In particular, in this embodiment, the light guide entering probability reducing unit 18 is a multilayer dielectric reflector being adapted for allowing light coming out of the light guide 5 to transmit through the multilayer dielectric reflector and for reflecting the photoluminescent light emitted by the photoluminescent material of the photoluminescent window 6.

Figure 4:
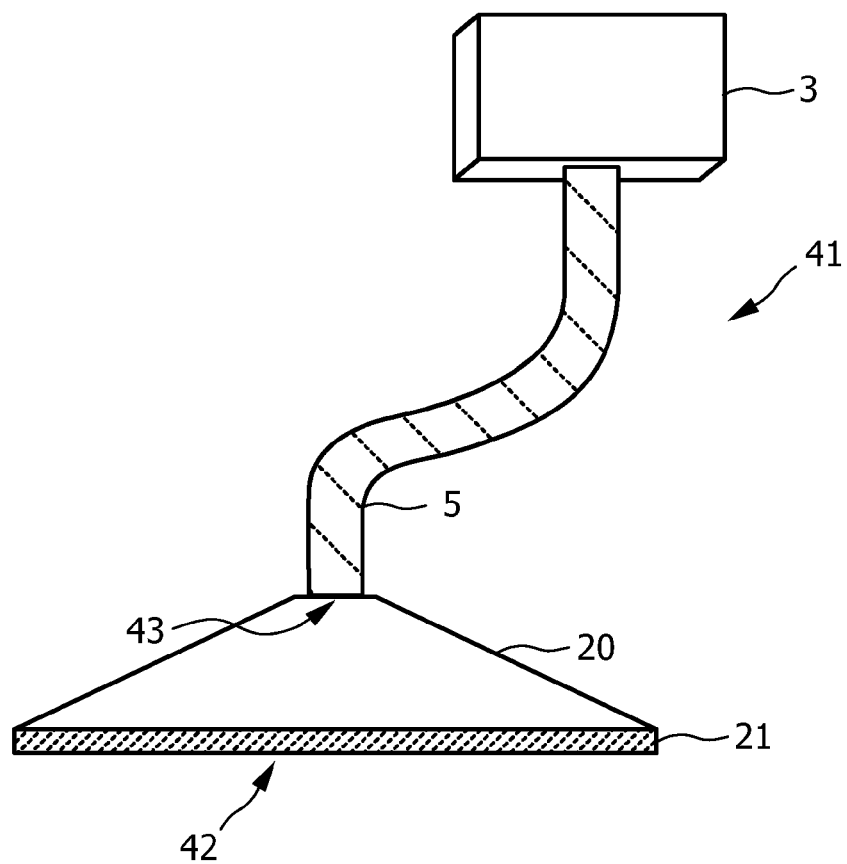
FIGS. 4 to 6 show schematically and exemplarily further embodiments of a daylight illumination apparatus.

FIG. 4 shows schematically and exemplarily a further embodiment of a daylight illumination apparatus. The daylight illumination apparatus 41 comprises a daylight collector 3 for collecting daylight and a light guide 5 for guiding the daylight to an illumination location along an optical path, wherein the daylight is absorbed by the light guide 5. Also in this embodiment the light guide 5 comprises preferentially one or several optical fibers. The daylight illumination apparatus 41 further comprises a plate 21 made of a visibly transparent base material like the above mentioned plastics or glass, wherein the base material comprises photoluminescent material. The photoluminescent material is, for example, incorporated into the base material or the base material is covered by the photoluminescent material. The photoluminescent material emits photoluminescent light for illuminating the illumination location when the photoluminescent material is illuminated by the daylight, wherein the photoluminescent material, i.e. the plate 21, is arranged within the optical path and adapted such that the photoluminescent light compensates for the absorption of the daylight by the light guide 5. In this embodiment, a light guide entering probability reducing unit 20 is arranged between the light guide 5 and the plate 21. The light guide entering probability reducing unit 20 is a light expander for expanding the light guided by the light guide 5 before meeting the plate 21. The photoluminescent light leaves the plate 21 at a surface 42 being parallel to the outcoupling surface 43 of the light guide 5.

Figure 5:
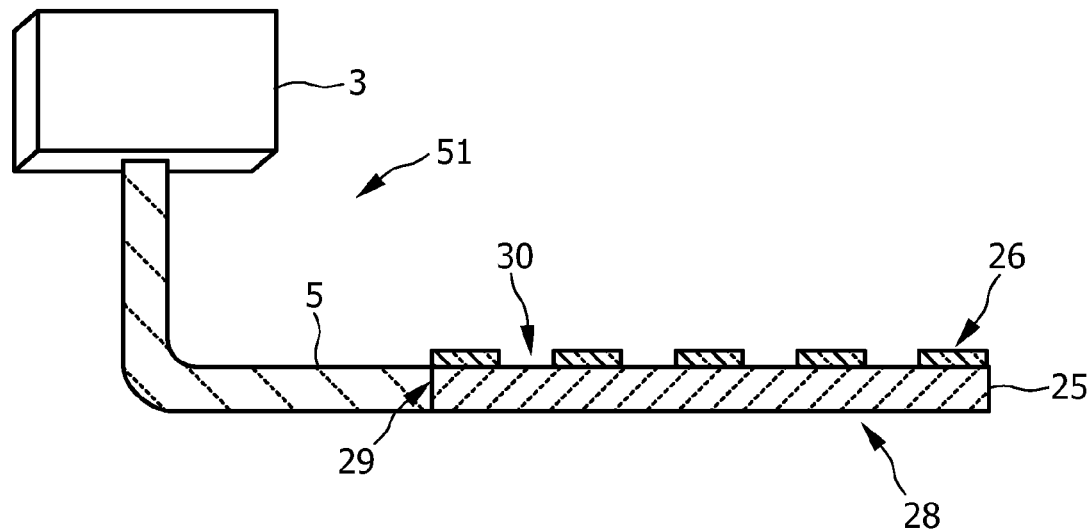

FIG. 5 shows schematically and exemplarily a further embodiment of a daylight illumination apparatus. The daylight illumination apparatus 51 also comprises a daylight collector 3 for collecting daylight and a light guide 5 for guiding the daylight to an illumination location along an optical path, wherein the daylight is absorbed by the light guide 5. The light guide 5 comprises preferentially one or several optical fibers. A light guide entering probability reducing unit 28 comprises a transparent plate 25 having two opposing main surfaces and side surfaces connecting the main surfaces. The light guide 5 and the transparent plate 25 are adapted such that light leaving the light guide 5 enters the transparent plate 25 via a side surface 29 of the transparent plate 25 and that the light leaves the transparent plate 25 via a main surface 30 of the transparent plate 25. Photoluminescent material 26 is arranged on the main surface 30 through which the light leaves the transparent plate 25. The photoluminescent material is structured to form an outcoupling structure for allowing the light to leave the transparent plate 25 through the main surface 30 and to illuminate the photoluminescent material on the main surface 30 by the light. The photoluminescent material 26 is adapted to emit photoluminescent light for illuminating the illumination location when the photoluminescent material 26 is illuminated by the daylight, wherein the photoluminescent material is adapted such that the photoluminescent light compensates for the absorption of the daylight by the light guide 5.

Light from the light guide 5 travels through the transparent plate 25 by total internal reflection until it hits a photoluminescent particle or dot. The light is either absorbed by the photoluminescent material and converted into photoluminescent light or diffusely reflected. In both cases the direction of the light is changed so that it can escape from the transparent plate. Possibly additional scattering particles can be added to the photoluminescent material to prevent that too much light is converted to photoluminescent light. The scattering particles can be mixed with the photoluminescent material, or can be arranged in a separate layer in between the transparent plate and the photoluminescent material. The photoluminescent layer structure and optionally an additional outcoupling structure can be applied on the transparent plate by, for example, screen printing. The optional additional outcoupling structure can also be provided by roughening the surface of the transparent plate by, for example, laser ablation. The outcoupling structure can be a pattern of dots, lines, or any other pattern fulfilling the task to achieve a homogeneous outcoupling along the length and width of the transparent plate 25. A diffuse or specular reflector can be added on the side of the transparent plate, parallel to the transparent plate, opposite to the main surface 30 and extending along the full length and width of the transparent plate, to enable outcoupling of light from only one side of the system by reflecting light coupled out from the transparent plate in the other direction.

Figure 6:
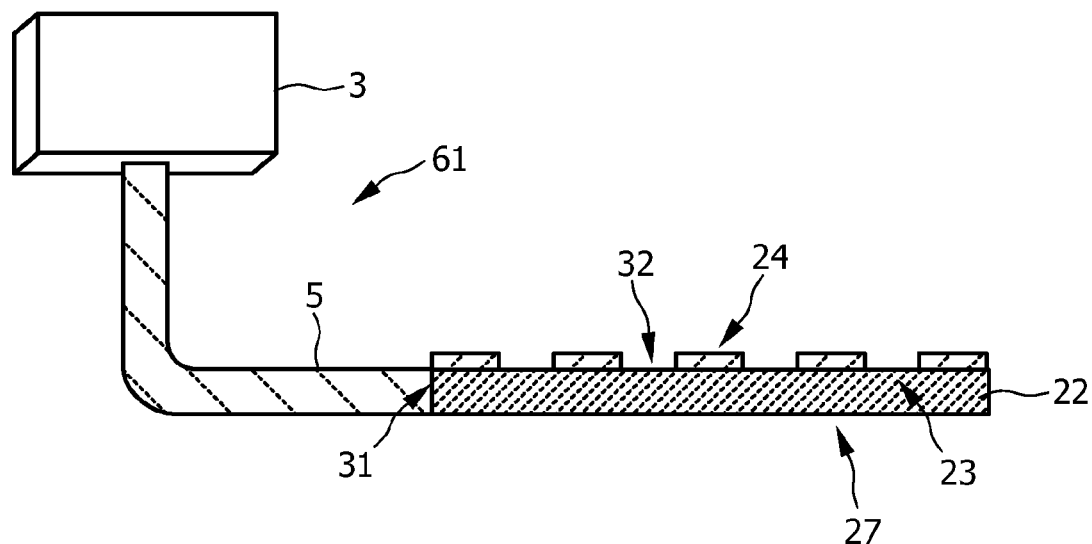

FIG. 6 shows schematically and exemplarily a further embodiment of a daylight illumination apparatus. The daylight illumination apparatus 61 comprises a daylight collector 3 for collecting daylight and a light guide 5 for guiding the daylight to an illumination location along an optical path, wherein the daylight is absorbed by the light guide 5. Also in this embodiment the light guide 5 comprises one or several optical fibers. A light guide entering probability reducing unit 27 comprises a transparent plate 22 having two opposing main surfaces and side surfaces connecting the main surfaces. The light guide 5 and the transparent plate 22 are adapted such that light leaving the light guide 5 enters the transparent plate 22 via a side surface 31 of the transparent plate 22 and that the light leaves the transparent plate 22 via a main surface 32 of the transparent plate 22. In this embodiment, photoluminescent material 23 is incorporated into the transparent plate 22. Preferentially the photoluminescent material is organic, like perylenes, for example one or more Lumogens, and the transparent plate 22 is made of plastics like, for example, PMMA or polycarbonate. Alternatively, the photoluminescent material is inorganic and the transparent plate 22 is made of glass or transparent ceramics. In order to allow the light coupled into the transparent plate 22 to leave the transparent plate 22 via the main surface 32, the main surface 32 comprises an outcoupling structure 24. This outcoupling structure can be a dot pattern of scattering particles, applied by, for example, screen printing, or can be a dot pattern of a roughened surface obtained by, for example, laser ablation. The outcoupling structure can be a pattern of dots, lines, or any other pattern fulfilling the task to achieve a homogeneous outcoupling along the length and width of the transparent plate 22. A diffuse or specular reflector can be added on the side of the transparent plate, parallel to the transparent plate, opposite to the main surface 32 and extending along the full length and width of the transparent plate, to enable outcoupling of light from only one side of the system by reflecting light coupled out from the transparent plate in the other direction. Also in this embodiment the photoluminescent material is adapted for emitting photoluminescent light for illuminating the illumination location when the photoluminescent material is illuminated by the daylight, wherein the photoluminescent material is arranged within the optical path and adapted such that the photoluminescent light compensates for the absorption of the daylight by the light guide.

In FIGS. 5 and 6 the photoluminescent light is emitted from the main surface 30, 32 being orthogonal to the outcoupling surface of the fiber 5.

In the embodiment described above with reference to FIGS. 5 and 6 a light incoupling element for improving the coupling of the light from the light guide 5 into the respective transparent plate 25, 22 and a light spreading element for spreading the incoming light from the light guide 5 over the entire side surface 29, 31 of the respective transparent plate 25, 22 may be provided.

In the embodiment described above with reference to FIGS. 5 and 6, the density of outcoupling elements is preferentially gradual along the length of the respective transparent plate 25, 22 such that, if light is coupled in from one side of the respective transparent plate 25, 22, the light outcoupling from the respective transparent plate 25, 22 is uniform in intensity. Thus, preferentially the density of outcoupling elements is lower close to the light guide and higher on the other side. This can be achieved by, for example, a gradual concentration of photoluminescent material and/or scattering particles, and/or by a gradual size change of the outcoupling pattern elements, and/or by a gradual density change of the outcoupling pattern elements, wherein the outcoupling pattern elements are, for example, dots or lines.

In the embodiments described above with reference to FIGS. 5 and 6, emitted, scattered and/or reflected light within the respective transparent plate 25, 22 is emitted, scattered and/or reflected in all directions, therefore the chance that it hits the relatively small entrance hole of the light guide is small, thereby reducing the probability that light enters the light guide again.

The embodiments of the daylight illumination apparatus described above with reference to FIGS. 4 to 6 can also comprise further elements described above with reference to FIG. 1. For example, also these embodiments can comprise a polarizer for polarizing the daylight and/or the photoluminescent light such that the polarization is similar to the polarization of natural direct daylight. Moreover, also the embodiments described above with reference to FIGS. 4 to 6 can comprise an active compensation light source for generating compensation light for further compensating for the absorption of the daylight by the light guide.

Figure 7:
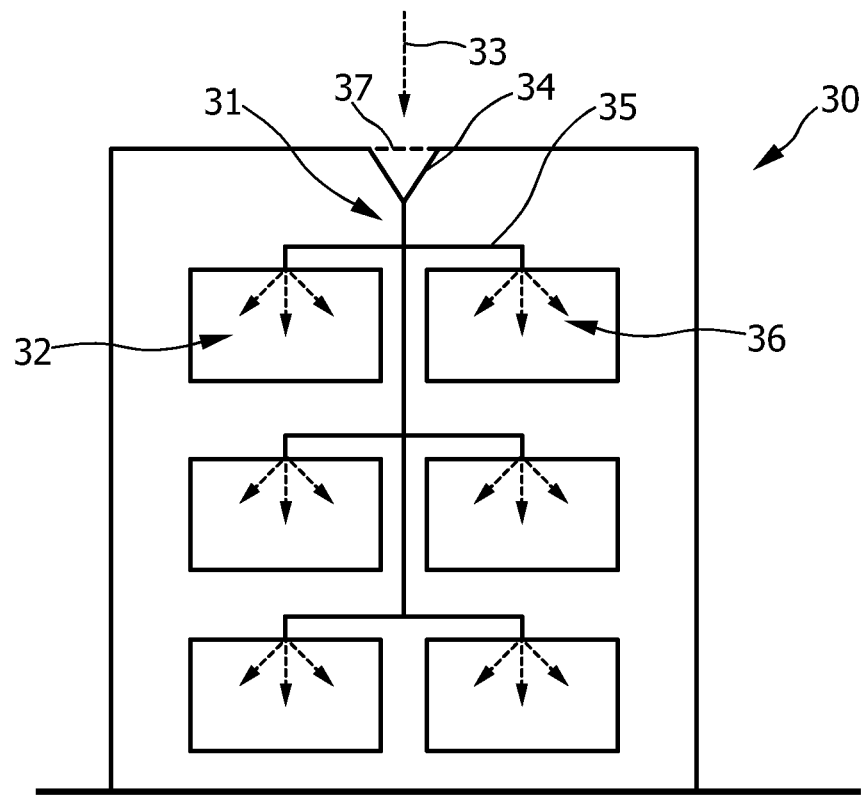
FIG. 7 shows schematically and exemplarily a building comprising a daylight illumination apparatus.

FIG. 7 shows schematically and exemplarily an embodiment of an object 30 comprising a daylight illumination apparatus 31. The daylight illumination apparatus 31 is similar to the daylight illumination apparatus described above with reference to FIG. 1. The main difference between the daylight illumination apparatus 31 shown in FIG. 7 and the daylight illumination apparatus 1 shown in FIG. 1 is that the daylight illumination apparatus 31 comprises several light guides 35 for distributing the daylight 33 collected by the daylight collector 34 to different regions 32 within the object 30. In this embodiment, the object is a building and the different regions 32 are rooms within the building 31, which are illuminated by compensated daylight 36. The daylight collector 34 is covered by a transparent plate 37 for protecting the daylight collector 34 against environmental influences like rain, snow, et cetera. Instead of the daylight illumination apparatus described above with reference to FIG. 1, the object 30 can also comprise another daylight illumination apparatus, for example, a daylight illumination apparatus being similar to one of the embodiments described above with reference to FIGS. 4 to 6.

Figure 8:
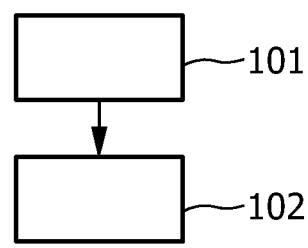
FIG. 8 shows a flowchart exemplarily illustrating an embodiment of a daylight illumination method.

In the following an embodiment of a daylight illumination method will exemplarily be described with reference to a flowchart shown in FIG. 8.

In step 101, daylight is collected by the daylight collector, and, in step 102, the daylight is guided by a light guide to an illumination location along an optical path, wherein the daylight is absorbed by the light guide. It should be noted that the daylight is, of course, only partially absorbed and not completely absorbed by the light guide. While being transmitted to the illumination location, the daylight illuminates a photoluminescent material such that photoluminescent light is emitted for illuminating the illumination location also with the photoluminescent light. The photoluminescent material is arranged within the optical path and the photoluminescent light compensates for the absorption of the daylight by the light guide.

The daylight illumination apparatus can be adapted for the delivery of daylight into parts of a building which cannot be reached by natural light. The daylight illumination apparatus comprises therefore the daylight collector, which may also be regarded as being a solar collector, and light guiding fibers, which offer a high versatility while consuming not more space inside a building then traditional artificial light sources, which, as a consequence, facilitates installation and leaves more freedom for the placement of luminaries of the daylight illumination apparatus, which illuminate the parts of the building with daylight. The daylight illumination apparatus can comprise optical fibers being made of plastics, which are not fully transparent in the visible range so that the daylight leaving the light guide is tinted. In particular, parts of the red spectrum of daylight are filtered out during travelling into the building via the optical fibers.

In an embodiment, artificial light, i.e. the light of the active compensation light source, provides a constant light level at the illumination location independent of the actual sun light intensity, whereas spectral losses in the red wavelength range caused by the one or several optical fibers of the daylight illumination apparatus are compensated by the addition of the above mentioned photoluminescent window for the optical fiber and/or the above mentioned photoluminescent screen.

The daylight mimicry can be further improved by polarizing the compensated daylight used for illuminating the illumination location, in particular, for illuminating one or several rooms within a building. Direct daylight is polarized. The daylight illumination apparatus is preferentially adapted such that the compensated daylight used for illuminating the illumination location comprises a polarization being similar to the natural polarization of direct natural daylight. For example, in the embodiment described above with reference to FIG. 1, the polarizer 10 is preferentially adapted such that the compensated daylight has a polarization being similar to the natural polarization of direct daylight. However, in other embodiments, alternatively or additionally, the photoluminescent material of the photoluminescent screen or of the photoluminescent window can also be adapted to emit photoluminescent light having a polarization being similar to the natural polarization of daylight. In particular, the photoluminescent screen and/or the photoluminescent window can comprise organic phosphor emitting photoluminescent light having a polarization being similar to the natural polarization of direct daylight.

Although in the embodiment described above with reference to FIG. 1 the daylight illumination apparatus comprises a photoluminescent window 6 and a photoluminescent screen 8, the daylight illumination apparatus can also comprise only one of the photoluminescent window 6 and the photoluminescent screen 8. Moreover, the photoluminescent material can also be arranged in another way along the optical path of the daylight, as long as the daylight illuminates the photoluminescent material and the photoluminescent light of the photoluminescent material also illuminates the illumination location, for example, a room within a building.

Although embodiments of the daylight illumination apparatus have been described above, which comprise a polarizer and/or photoluminescent material emitting polarized light being similar to the natural polarization of daylight, the daylight illumination apparatus can also be adapted to emit a combination of daylight, photoluminescent light and optionally compensation light of an active compensation light source, without providing a polarizing functionality, i.e., for example, without polarizing this light.

Although in the above mentioned embodiments certain daylight collectors and light guides for distributing the collected daylight have been described, the daylight illumination apparatus can also comprise another daylight collector and/or another light guide. For example, the daylight collector and light guides used by the daylight lighting systems of the company Parans Solar Lighting AB can be used by the daylight illumination apparatus, wherein at least the photoluminescent material for emitting photoluminescent light for compensating for the absorption of the daylight in the light guides is added to the daylight lighting systems.

Although certain embodiments of the daylight illumination apparatus have been described as having certain light guide entering probability reducing units, the embodiments of the daylight illumination apparatus can also comprise another light guide entering probability reducing unit or they may not comprise any light guide entering probability reducing unit. In particular, each of the embodiments of the daylight illumination apparatus described above can comprise a light guide entering probability reducing unit of the other embodiments of the daylight illumination apparatus described above. For example, in an embodiment, which is similar to the embodiment described above with reference to FIG. 1, the daylight illumination apparatus may not comprise the photoluminescent window 6, but only the photoluminescent screen 8, wherein the luminaire 7 can be the light expander 20 shown in FIG. 4, in order to expand the light received from the light guide 5 before meeting the photoluminescent screen 8.

The daylight illumination apparatus may be of use in a broad variety of systems and/or applications. For example, the daylight illumination apparatus can be adapted to be used in at least one of the following systems: Office lighting systems, household application systems, shop lighting systems, home lighting systems, industry lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications and green house lighting systems.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention relates to a daylight illumination apparatus. A daylight collector collects daylight, which is guided to an illumination location to be illuminated along an optical path by a light guide, wherein the daylight is absorbed by the light guide. A photoluminescent material is arranged within the optical path and emits photoluminescent light that compensates for the absorption of the daylight by the light guide. Absorption losses of the daylight can therefore effectively be compensated, without necessarily needing, for example, an active compensation light source. This allows providing compensated daylight illumination in a technically relatively simple way.

The invention claimed is:

1. A daylight illumination apparatus comprising:
   a daylight collector for collecting daylight;
   a light guide for receiving the collected daylight, and for guiding and outputting a first portion of the daylight for an illumination location to be illuminated along an optical path, wherein a second portion of the daylight is absorbed by the light guide; and
   a photoluminescent material for emitting photoluminescent light for illuminating the illumination location when the photoluminescent material absorbs a part of the first portion of the daylight, wherein the photoluminescent material is arranged within the optical path and adapted such that the photoluminescent light compensates for the absorption of the second portion of the daylight by the light guide, and wherein the apparatus produces a combination of a remainder of the first portion of the daylight and said photoluminescent light such that the combination is more similar to the collected daylight than the first portion of the daylight output by the light guide.

2. The daylight illumination apparatus as defined in claim 1, wherein the light guide comprises an optical fiber having an in-coupling site for coupling the collected daylight into the optical fiber and an out-coupling site for coupling the first portion of the daylight out of the optical fiber, wherein the photoluminescent material is located at the out-coupling site of the optical fiber.

3. The daylight illumination apparatus as defined in claim 1, further comprising a polarizer for polarizing at least one of the remainder of the first portion of the daylight and the photoluminescent light to a polarization being more similar to a natural polarization of the collected daylight.

4. A daylight illumination apparatus comprising:
   a daylight collector for collecting daylight;
   a light guide for guiding a first portion of the daylight for an illumination location to be illuminated along an optical path, wherein a second portion of the daylight is absorbed by the light guide; and
   a photoluminescent material for emitting photoluminescent light for illuminating the illumination location when the photoluminescent material is illuminated by the first portion of the daylight, wherein the photoluminescent material is arranged within the optical path and adapted such that the photoluminescent light compensates for the absorption of the second portion of the daylight by the light guide, wherein the light guide absorbs light of a first spectral part of the collected daylight more than light of a second spectral part of the collected daylight and wherein the photoluminescent light includes light having a wavelength in the first spectral part.

5. A daylight illumination apparatus comprising:
   a daylight collector for collecting daylight;
   a light guide for guiding a first portion of the daylight for an illumination location to be illuminated along an optical path, wherein a second portion of the daylight is absorbed by the light guide;
   a photoluminescent material for emitting photoluminescent light for illuminating the illumination location when the photoluminescent material is illuminated by the first portion of the daylight, wherein the photoluminescent material is arranged within the optical path and adapted such that the photoluminescent light compensates for the absorption of the second portion of the daylight by the light guide; and
   an active compensation light source for generating compensation light for further compensating for the absorption of the second portion of the daylight by the light guide.

6. The daylight illumination apparatus as defined in claim 5, wherein the compensation light has a spectral distribution that is similar to the spectral distribution of direct natural daylight.

7. The daylight illumination apparatus as defined in claim 5, further comprising:
   an intensity determination unit for determining the intensity of the light at the illumination location, and
   a control unit for controlling the active compensation light source depending on the determined intensity.

8. A daylight illumination apparatus comprising:
   a daylight collector for collecting daylight;
   a light guide for guiding a first portion of the daylight for an illumination location to be illuminated along an optical path, wherein a second portion of the daylight is absorbed by the light guide;
   a photoluminescent material for emitting photoluminescent light for illuminating the illumination location when the photoluminescent material is illuminated by the first portion of the daylight, wherein the photoluminescent material is arranged within the optical path and adapted such that the photoluminescent light compensates for the absorption of the second portion of the daylight by the light guide; and
   a light guide entering probability reducing unit for reducing the probability of the photoluminescent light entering the light guide.

9. The daylight illumination apparatus as defined in claim 8, wherein, with respect to the optical path, the light guide entering probability reducing unit is arranged between the light guide and the photoluminescent material.

10. The daylight illumination apparatus as defined in claim 9, wherein light guide entering probability reducing unit is a multilayer dielectric reflector being adapted for allowing the first portion of the daylight coming out of the light guide to transmit through the multilayer dielectric reflector and for reflecting the photoluminescent light emitted by the photoluminescent material.

11. The daylight illumination apparatus as defined in claim 8, wherein the light guide entering probability reducing unit is a light expander for expanding the first portion of the daylight guided by the light guide before meeting the photoluminescent material.

12. The daylight illumination apparatus as defined in claim 8, wherein the light guide entering probability reducing unit comprises a transparent plate having two opposing main surfaces and side surfaces connecting the main surfaces, wherein the light guide and the transparent plate are adapted such that the first portion of the daylight leaving the light guide enters the transparent plate via one of said side surfaces of the transparent plate and that the photoluminescent light leaves the transparent plate from one of the main surfaces of the transparent plate, wherein the photoluminescent material is arranged on the main surface from which the photoluminescent light leaves the transparent plate.

13. The daylight illumination apparatus as defined in claim 8, wherein the light guide entering probability reducing unit comprises a transparent plate having two opposing main surfaces and side surfaces connecting the main surfaces, wherein the light guide and the transparent plate are adapted such that the first portion of the daylight leaving the light guide enters the transparent plate via one of said side surfaces of the transparent plate and that the photoluminescent light leaves the transparent plate from one of the main surfaces of the transparent plate, wherein the photoluminescent material is incorporated into the transparent plate.

14. A daylight illumination method comprising:
collecting daylight by a daylight collector;
receiving the collected daylight, and guiding and outputting a first portion the daylight for an illumination location to be illuminated along an optical path by a light guide, wherein a second portion of the daylight is absorbed by the light guide;
illuminating a photoluminescent material for emitting photoluminescent light by absorbing a part of the first portion of the daylight for illuminating the illumination location, wherein the photoluminescent material is arranged within the optical path and the photoluminescent light compensates for the absorption of the second portion of the daylight by the light guide; and
producing a combination of a remainder of the first portion of the daylight and said photoluminescent light such that the combination is more similar to the collected daylight than the first portion of the daylight output by the light guide.

15. The daylight illumination method of claim 14, wherein the light guide absorbs light of a first spectral part of the collected daylight more than light of a second spectral part of the collected daylight and wherein the photoluminescent light has a wavelength in the first spectral part.

16. The daylight illumination method of claim 14, wherein the light guide comprises an optical fiber having an in-coupling site for coupling the collected daylight into the optical fiber and an out-coupling site for coupling the first portion of the daylight out of the optical fiber, wherein the photoluminescent material is located at the out-coupling site of the optical fiber.

17. The daylight illumination method of claim 14, further comprising generating compensation light by an active compensation light source for further compensating for the absorption of the second portion of the daylight by the light guide.

18. The daylight illumination method of claim 17, wherein the compensation light has a spectral distribution that is similar to the spectral distribution of direct natural daylight.

19. The daylight illumination method of claim 14, further comprising polarizing at least one of the remainder of the first portion of the daylight and the photoluminescent light to a polarization being more similar to a natural polarization of the collected daylight.

20. The daylight illumination method of claim 14, further comprising reducing, by a light guide entering probability reducing unit, the probability of the photoluminescent light entering the light guide.

* * * * *